US007854779B2

(12) United States Patent
Oh

(10) Patent No.: US 7,854,779 B2
(45) Date of Patent: Dec. 21, 2010

(54) DUST SEPARATING APPARATUS FOR VACUUM CLEANER

(75) Inventor: Jang-Keun Oh, Seo-Gu (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 319 days.

(21) Appl. No.: 12/140,393

(22) Filed: Jun. 17, 2008

(65) Prior Publication Data

US 2009/0165431 A1 Jul. 2, 2009

(30) Foreign Application Priority Data

Jan. 2, 2008 (KR) ...................... 10-2008-0000423

(51) Int. Cl.
*B01D 45/12* (2006.01)

(52) U.S. Cl. ............................. 55/337; 55/426; 55/429; 55/457; 55/459.1; 55/DIG. 3

(58) Field of Classification Search ................... 55/337, 55/426, 429, 457, 459.1, DIG. 3
See application file for complete search history.

(56) References Cited

U.S. PATENT DOCUMENTS

2008/0010957 A1 * 1/2008 Yun et al. ..................... 55/399

FOREIGN PATENT DOCUMENTS

| | | |
|---|---|---|
| GB | 205155 | 10/1923 |
| GB | 2446580 | 8/2008 |
| KR | 100662648 | 12/2006 |
| WO | WO-02/18056 | 3/2002 |

* cited by examiner

*Primary Examiner*—Robert A Hopkins
(74) *Attorney, Agent, or Firm*—Blank Rome LLP

(57) ABSTRACT

A dust separating apparatus for a vacuum cleaner which is compact in configuration and is capable of preventing dirt from piling up on an entrance channel is provided. The dust separating apparatus includes a dust collecting receptacle adapted to collect dirt, and a cyclone unit eccentrically disposed in the dust collecting receptacle and adapted to whirl air drawn in through an inflow channel thereof, and the inflow channel may have an inclined upper surface which slopes downward toward a bottom of the dust collecting receptacle by a predetermined angle.

12 Claims, 3 Drawing Sheets

DUST SEPARATING APPARATUS FOR VACUUM CLEANER

CROSS-REFERENCE TO RELATED APPLICATION

This application claims priority from Korean Patent Application No. 10-2008-0000423, filed on Jan. 2, 2008, in the Korean Intellectual Property Office, the entire disclosure of which is hereby incorporated by reference.

FIELD OF THE INVENTION

Methods and apparatuses consistent with the present invention relate to a vacuum cleaner, and more particularly, to a dust separating apparatus for a vacuum cleaner which separates dirt from air drawn in from a cleaning surface.

BACKGROUND OF THE INVENTION

A general vacuum cleaner draws in dirt-filled air from a cleaning surface through a brush. Such a vacuum cleaner employs a dust separating apparatus to separate dirt from the air drawn in from the cleaning surface and to collect the dirt therein.

The dust separating apparatus for the vacuum cleaner often uses a cyclone such that it whirls drawn-in air in a cyclone and separates dirt from the air due to a difference in centrifugal forces of the air and the dirt. This cyclone type dust separating apparatus does not require an extra dust bag to collect dirt separated from the drawn-in air, but instead requires a dust collecting receptacle to collect dirt therein.

The dust separating apparatus for the vacuum cleaner described above has a cyclone unit to generate a cyclone and the cyclone unit is located substantially in a center of the dust collecting receptacle where dirt is collected.

In this case, however, the dust collecting receptacle requires an additional capacity that compensates for the area occupied by the cyclone unit. This increase in the capacity of the dust collecting receptacle results in a big-sized dust separating apparatus.

Also, the dust separating apparatus of the prior art has a problem that some of dirt whirled by the cyclone and floating in the dust collecting receptacle does not drop down and piles up on an upper surface of an inflow channel through which the drawn-in air flows into the cyclone unit. Consequently, the dirt separated from the drawn-in air is not collected on the dust collecting receptacle and thus the dust collecting efficiency deteriorates.

SUMMARY OF THE INVENTION

Exemplary embodiments of the present invention overcome the above disadvantages and other disadvantages not described above.

An aspect of the present invention is to provide a dust separating apparatus for a vacuum cleaner which is capable of achieving compactness in configuration.

Another aspect of the present invention is to provide a dust separating apparatus for a vacuum cleaner which prevents whirled dirt from piling up on an upper surface of an inflow channel, thereby improving a dust collecting efficiency.

The foregoing and/or other aspects and utilities of the present invention may be achieved by a vacuum cleaner, including a dust collecting receptacle adapted to collect dirt, and a cyclone unit eccentrically disposed in the dust collecting receptacle and adapted to whirl air drawn in through an inflow channel thereof, and the inflow channel may have an inclined upper surface which slopes downward toward a bottom of the dust collecting receptacle by a predetermined angle.

The foregoing and/or other aspects and utilities of the present invention may also be achieved by a dust separating apparatus for a vacuum cleaner including a dust collecting receptacle adapted to collect dirt, a cyclone unit including an inlet and an outlet for drawn-in air, and a cyclone that separates dirt from the drawn-in air using a cyclone, and an inflow channel which has an inclined surface formed thereon and sloping downwards toward a bottom of the dust collecting receptacle by a predetermined angle, the inflow channel guiding the drawn-in air into the inlet, and a part of the cyclone unit may form a part of an exterior of the dust collecting receptacle.

BRIEF DESCRIPTION OF THE DRAWINGS

Above and other aspects of the present invention will become apparent and more readily appreciated from the following description of the exemplary embodiments, taken in conjunction with the accompany drawings of which.

DETAILED DESCRIPTION OF EXEMPLARY EMBODIMENTS

Figure 1:
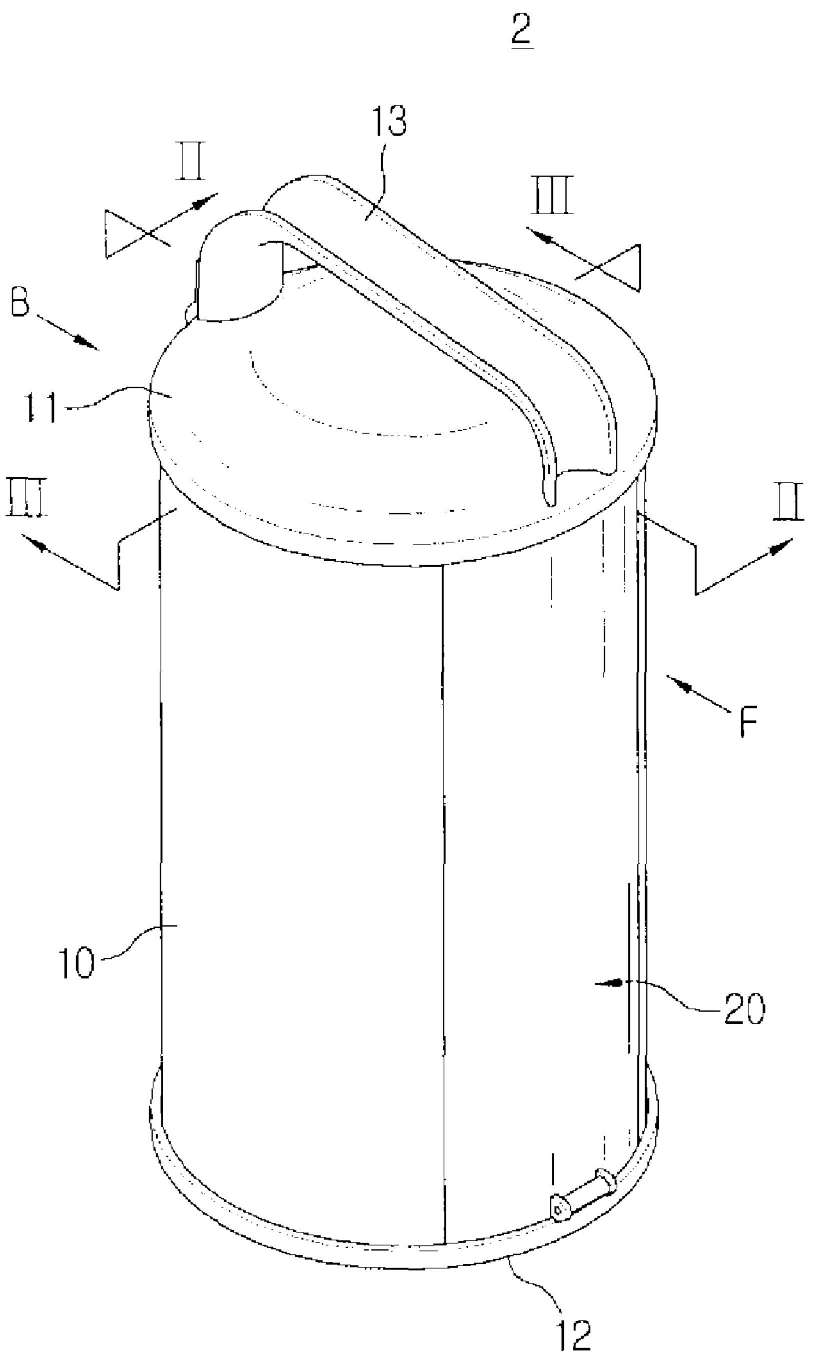
FIG. 1 is a perspective view illustrating a dust separating apparatus for a vacuum cleaner according to an exemplary embodiment of the present invention.

Certain exemplary embodiments of the present invention will be described in greater detail with reference to the accompanying drawings.

In the following description, the same drawing reference numerals are used for the same elements in different drawings. The matter defined in the description, such as detailed construction and elements, are provided to assist in a comprehensive understanding of the invention. Thus, it is apparent that the exemplary embodiments of the present invention can be carried out without this specifically defined matter. Also, well-known functions or constructions are not described in detail since they would obscure the invention with unnecessary detail.

Hereinafter, a dust separating apparatus for a vacuum cleaner according to an exemplary embodiment of the present invention will be described with reference to the accompanying drawings.

Figure 2:
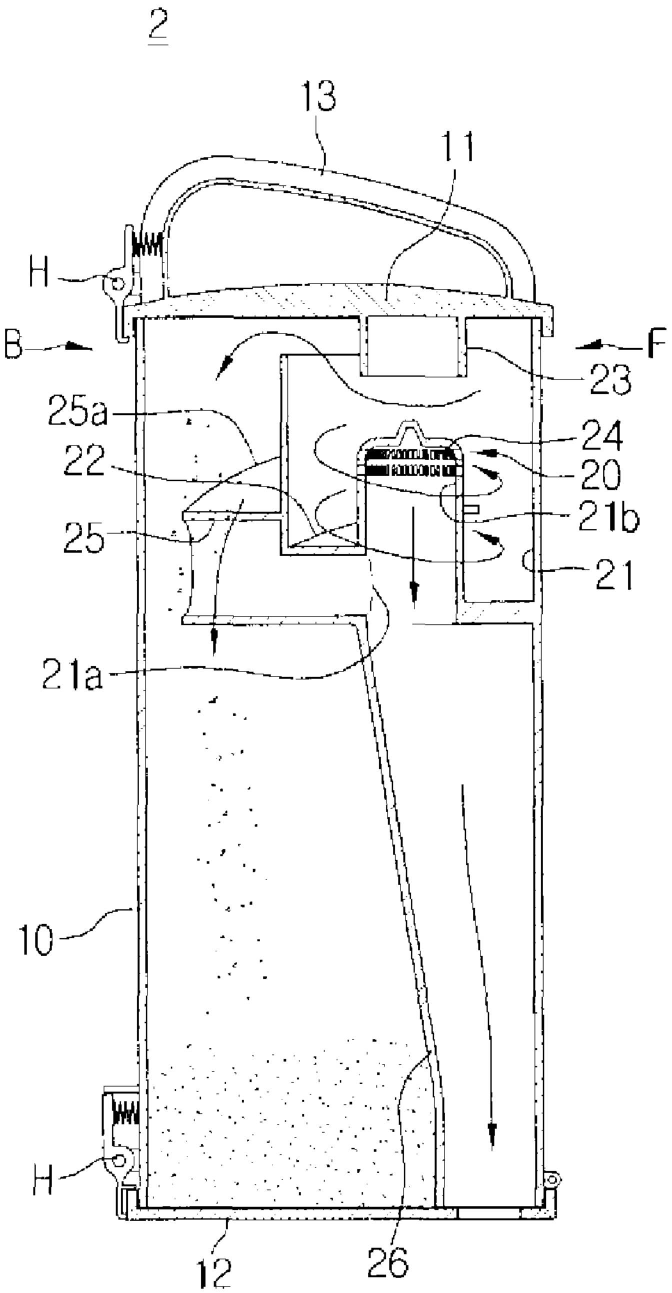
FIG. 2 is a cross sectional view taken along line II-II of FIG. 1.
Figure 3:
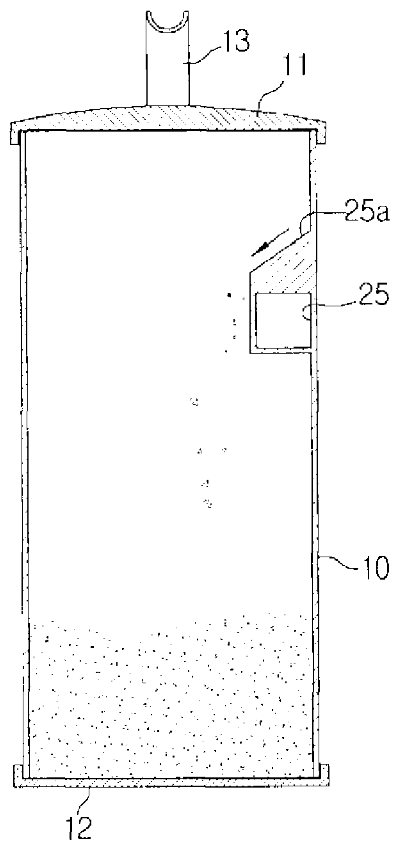
FIG. 3 is a cross sectional view taken along line III-III of FIG. 1.

Referring to FIGS. 1 to 3, a dust separating apparatus 2 for a vacuum cleaner according to an exemplary embodiment of the present invention may include a dust collecting receptacle 10 and a cyclone unit 20.

Figure 4:
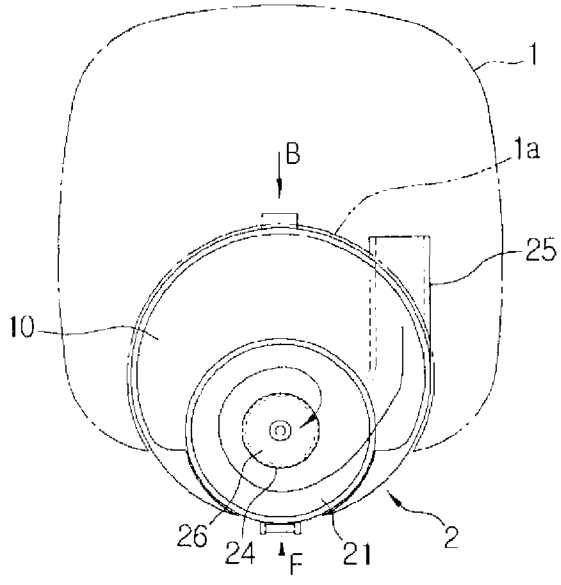
FIG. 4 is a top view illustrating the dust separating apparatus of FIG. 1 mounted on a vacuum cleaner body and a cover of the apparatus removed.

The dust collecting receptacle 10, as shown in FIG. 2, has a space where dirt separated from air drawn in from the outside is collected, and, as shown in FIG. 4, it is removably mounted on a cleaner body 1 (FIG. 4). The dust collecting receptacle 10 is mounted on a depression 1*a* of the cleaner body 1 and is partially protruding from the cleaner body 1.

For the convenience of explanation, an area of the dust collecting receptacle 10 that is concealed by the cleaner body 1 is referred to as a "back portion B", and an area that is protruding from the cleaner body 1 is referred to as a "front portion F".

The cleaner body 1 on which the dust collecting receptacle 10 is mounted includes various elements such as a suction motor (not shown) and a suction brush (not shown) required to draw in dirt-filled air from a cleaning surface. The technical configuration of this cleaner body 1 will be understood from the well-known art and thus detailed description and illustration thereof will be omitted.

The dust collecting receptacle 10 may have an upper cover 11 and a lower cover 12 which are, respectively, connected to an upper portion and a lower portion thereof by a hinge H to be opened and closed.

The upper cover 11 is located on the upper portion of the dust collecting receptacle and forms an upper surface of the dust collecting receptacle 10. The upper cover 11 opens the dust collecting receptacle 10 for the purpose of maintenance and repair.

A handle 13 is formed on the upper cover 11 for the user's convenience. The handle 13 is inclined by a predetermined angle, as shown in FIG. 2, and also has a concave form on an upper surface thereof. Consequently, floating dirt does not pile up on the handle 13 and drops down due to gravity. Also, a user can easily grip the handle 13.

The lower cover 12 forms a bottom of the dust collecting receptacle 10 and opens the dust collecting receptacle 10 to allow collected dirt to be discharged.

As shown in FIG. 2, the cyclone unit 20 may be eccentrically disposed at a side in the dust collecting receptacle 10 and whirls the air flowing in through an inlet 21*a* using a cyclone and separates dirt from the air using a centrifugal force.

The cyclone unit 20 may include a cyclone body 21, a first guide 22 and a second guide 23, and a grille 24.

As shown in FIGS. 2 and 4, the cyclone body 21 is disposed toward the front portion F of the dust collecting receptacle 10 and forms a part of an exterior of the dust-collecting receptacle 10. More specifically, the front portion F of the cyclone body 21 is exposed to the outside from the dust-collecting receptacle 10 and a certain area of the back portion B of the cyclone body 21 is covered by the dust collecting receptacle 10.

Accordingly, the exposed front portion F of the cyclone body 21 forms a part of the exterior of the dust separating apparatus 2.

As described above, the cyclone body 21 may be disposed toward the front portion F of the dust-collecting receptacle 10 so that a collecting space of the dust collecting receptacle 10 is provided and also an extra installing area for the cyclone unit 20 is provided, compared to the prior art where the cyclone body 21 is located in a center of the dust collecting receptacle 10.

The cyclone body 21 may include the inlet 21*a* connected to an inflow channel 25 through which the draw-in air flows in, and an outlet 21*b* connected to a discharge channel 26 through which air separated from dirt by a cyclone is discharged to the outside.

As shown in FIG. 4, the inflow channel 25 is formed along an inner surface of the dust collecting receptacle 10 and is connected to the inlet 21*a* formed under the cyclone body 21. As shown in FIGS. 2 and 3, the inflow channel 25 has an inclined surface 25*a* which is formed on an upper surface of the inflow channel 25 and inclined toward a bottom of the dust collecting receptacle where the dirt drops down due to gravity, i.e., toward the lower cover 12, by a predetermined angle. Because of the inclined surface 25*a* of the inflow channel 25, dirt discharged from the cyclone body 21 will not pile up on the upper surface of the inflow channel 25 and instead will smoothly drop down to the bottom of the dust collecting receptacle 10.

As shown in FIGS. 2 and 4, the discharge channel 26 fluidly communicates with the outlet 21*b* disposed substantially in a center of the cyclone body 21 and discharges the air separated from the air therethrough. The first guide 22 is formed adjacent to the inlet 21*a* in a spiral pattern to whirl of the air flowing in through the inlet 21*a*. The second guide 23 is formed under the upper cover 11 facing the outlet 21*b* and guides the whirling of the drawn-in air. The grille 24 filters the air once more prior to discharging it through the discharge channel 26.

The dust separating operation of the dust separating apparatus 2 for the vacuum cleaner constructed above according to the exemplary embodiment of the present invention will now be described with reference to FIGS. 1 to 4.

When the dust separating apparatus 2 is mounted on the depression 1*a* of the cleaner body 1, as shown in FIG. 4, dirt-filled air is drawn in the dust separating apparatus 2 from a cleaning surface through the inflow channel 25 by a suction force generated in the cleaner body 1.

More specifically, as shown in FIG. 2, the air drawn in through the inflow channel 25 flows into the cyclone body 21 through the inlet 21*a* of the cyclone body 21. The drawn-in air forms a cyclone due to the first and the second guides 22 and 23 of the cyclone body 21, such that the air and the dirt are separated from each other due to a difference in their centrifugal forces.

The dirt separated from the air in the cyclone body 21 by the cyclone is discharged from the cyclone body 21 to the dust collecting receptacle 10. The dirt discharged from the cyclone body 21 drops down due to gravity and is collected on the lower cover 12 of the dust collecting receptacle 10.

The dirt smoothly drops down along the inclined surface 25*a* formed on the upper surface of the inflow channel 25.

The air separated from the dirt in the cyclone body 21 is filtered once more by the grille 24 of the outlet 21*b* and is then discharged to the outside through the discharge channel 26. The dirt separated and collected on the bottom of the dust collecting receptacle 10 through the above-described cyclone dust separating procedure is discharged from the dust-collecting receptacle 10 by an opening the lower cover 12.

The dust separating apparatus 2 for the vacuum cleaner according to the exemplary embodiment of the present invention may have the cyclone unit 20 disposed in the area of the dust collecting receptacle 10 protruding from the cleaner body 1 and forming a part of the exterior of the dust collecting receptacle 10. Accordingly, there will always be space for the dust collecting receptacle 10 and space for the cyclone unit 20 in the dust separating apparatus 2, even with a small capacity. Consequently, a compact-sized dust separating apparatus can be provided.

Also, the upper surface of the inflow channel 25 through which the drawn-in air flows into the cyclone unit 20 may be inclined toward the bottom of the dust collecting receptacle 10, preventing dirt from piling up on the upper surface of the inflow channel 25. Consequently, the dust collecting efficiency of the dust collecting receptacle 10 is improved.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A dust separating apparatus for a vacuum cleaner, the dust separating apparatus comprising of:

a dust collecting receptacle adapted to collect dirt; and a cyclone unit eccentrically disposed in the dust collecting receptacle and adapted to whirl air drawn in through an inflow channel thereof, the cyclone unit including a cyclone body having an inlet in fluid communication with the inflow channel and an outlet in fluid communication with a discharge channel through which air separated from dirt is discharged, a first guide formed at a side of the inlet in a spiral pattern for whirling drawn-in air, a second guide formed on an upper portion of the cyclone body facing the outlet and for whirling the drawn-in air, and a grille disposed at the outlet for filtering the air;

wherein the inflow channel has an inclined upper surface which slopes downward toward a bottom of the dust collecting receptacle by a predetermined angle.

2. The dust separating apparatus as claimed in claim 1, wherein the dust collecting receptacle is configured to be removably mounted on a cleaner body with an area protruding from the cleaner body, wherein the cyclone unit is partially disposed in the protruding area of the dust collecting receptacle.

3. The dust separating apparatus as claimed in claim 2, wherein a part of the cyclone unit forms a part of an exterior of the dust collecting receptacle.

4. The dust separating apparatus as claimed in claim 3, wherein the dust-collecting receptacle has an upper cover formed on an upper portion thereof to selectively open the dust collecting receptacle, wherein a handle is formed on the upper cover.

5. The dust separating apparatus as claimed in claim 4, wherein the dust collecting receptacle has a lower cover formed on a bottom thereof and being openable to discharge collected dirt.

6. The dust separating apparatus as claimed in claim 1, wherein the inflow channel is formed along an inner surface of the dust collecting receptacle.

7. A dust separating apparatus for a vacuum cleaner, comprising of:

a dust collecting receptacle adapted to collect dirt;

a cyclone unit disposed in the dust collecting receptacle, the cyclone unit including an inlet for drawn-in air, an outlet, a cyclone that separates dirt from the drawn-in air, a first guide formed at a side of the inlet in a spiral pattern for whirling the drawn-in air, a second guide formed on an upper portion of the cyclone body facing the outlet and for whirling the drawn-in air, and a grille disposed at the outlet for filtering the air; and an inflow channel which has an inclined surface formed thereon and sloping downwards toward a bottom of the dust collecting receptacle by a predetermined angle, the inflow channel guiding the drawn-in air into the inlet, wherein a part of the cyclone unit forms a part of an exterior of the dust collecting receptacle.

8. The dust separating apparatus as claimed in claim 7, wherein the inflow channel is formed along an inner surface of the dust collecting receptacle.

9. The dust separating apparatus as claimed in claim 7, wherein the cyclone unit is eccentrically disposed in the dust collecting receptacle.

10. The dust separating apparatus as claimed in claim 9, wherein the dust collecting receptacle is configured to be removably mounted on a cleaner body with an area protruding from the cleaner body, wherein the cyclone unit is partially disposed in the protruding area of the dust collecting receptacle.

11. The dust separating apparatus as claimed in claim 10, wherein the dust-collecting receptacle has an upper cover formed on an upper portion thereof to selectively open the dust collecting receptacle, wherein a handle is formed on the upper cover.

12. The dust separating apparatus as claimed in claim 11, wherein the dust collecting receptacle has a lower cover formed on a bottom thereof and being openable to discharge collected dirt.

* * * * *